United States Patent
Seo et al.

(10) Patent No.: US 12,288,338 B2
(45) Date of Patent: Apr. 29, 2025

(54) DEVICE AND METHOD FOR MODELING THREE-DIMENSIONAL ORGAN BY IMAGE SEGMENTATION

(71) Applicant: SEEANN SOLUTION CO., LTD., Incheon (KR)

(72) Inventors: An Na Seo, Incheon (KR); Jong Min Lee, Daegu (KR); Young Jin Jeong, Daegu (KR)

(73) Assignee: SEEANN SOLUTION CO., LTD., Incheon (KR)

( * ) Notice: Subject to any disclaimer, the term of this patent is extended or adjusted under 35 U.S.C. 154(b) by 383 days.

(21) Appl. No.: 17/844,517

(22) Filed: Jun. 20, 2022

(65) Prior Publication Data

US 2022/0392076 A1   Dec. 8, 2022

Related U.S. Application Data

(63) Continuation of application No. PCT/KR2020/018694, filed on Dec. 18, 2020.

(30) Foreign Application Priority Data

Dec. 20, 2019  (KR) .................. 10-2019-0171952
Dec. 18, 2020  (KR) .................. 10-2020-0178173

(51) Int. Cl.
*G06T 7/11*     (2017.01)
*G06T 7/00*     (2017.01)
*G06V 10/24*    (2022.01)

(52) U.S. Cl.
CPC .............. *G06T 7/11* (2017.01); *G06T 7/0012* (2013.01); *G06V 10/24* (2022.01); *G06T 2207/10088* (2013.01)

(58) Field of Classification Search
CPC ....................................................... G06T 7/11
See application file for complete search history.

(56) References Cited

U.S. PATENT DOCUMENTS 9,092,852 B2 *  7/2015  Binnig .................. G06T 7/0012
10,448,915 B2  10/2019  De Man et al.
(Continued)

FOREIGN PATENT DOCUMENTS

CN          108154560 A  *  6/2018
KR     10-2015-0108701 A     9/2015
(Continued)

OTHER PUBLICATIONS

International Search Report issued in PCT/KR2020/018694; mailed Apr. 1, 2021.

*Primary Examiner* — Di Xiao
(74) *Attorney, Agent, or Firm* — Studebaker Brackett PLLC

(57) ABSTRACT

The present disclosure relates to a method for three-dimensionally modeling an organ through image segmentation. The three-dimensional modeling of an organ includes the operations of: receiving one or more pieces of medical image data for a specific bodily organ of a target object; setting a region of interest with respect to the bodily organ based on the one or more pieces of medical image data; forming one or more blocks corresponding to the region of interest, wherein the blocks include a portion of the bodily organ corresponding to the regions of interest; setting a segment algorithm for each of the blocks; generating first image data respectively performing 3D modeling of portions contained in the blocks based on algorithms set to the blocks; and merging the first image data, and generating a three-dimensional section image data with respect to the entire bodily organ.

10 Claims, 7 Drawing Sheets

(56) References Cited

U.S. PATENT DOCUMENTS

2021/0068793 A1* 3/2021 Singanamalli ........... A61B 8/54
2021/0346091 A1* 11/2021 Haslam ................. G16H 30/40

FOREIGN PATENT DOCUMENTS

| KR | 10-1982149 B1 | 5/2019 | | |
|----|---------------|--------|---|---|
| KR | 101981202 B1* | 5/2019 | | |
| KR | 10-1986571 B | 6/2019 | | |
| KR | 10-1999785 B1 | 7/2019 | | |
| KR | 10-2015-0125436 A | 5/2021 | | |
| WO | WO-2018189039 A1* | 10/2018 | ........... | G06T 3/4038 |
| WO | WO-2019012066 A1* | 1/2019 | ............. | A61B 34/10 |

* cited by examiner

DEVICE AND METHOD FOR MODELING THREE-DIMENSIONAL ORGAN BY IMAGE SEGMENTATION

CROSS-REFERENCE TO RELATED APPLICATION

The present application is a continuation of International Patent Application No. PCT/KR2020/018694, filed on Dec. 18, 2020, which is based upon and claims the of priority to Korean Patent Application No. 10-2019-0171952, filed on Dec. 20, 2019 and Korean Patent Application No. 10-2020-0178173, filed on Dec. 18, 2020. The disclosures of the above-listed applications are hereby incorporated by reference herein in their entirety.

BACKGROUND

1. Technical Field

The present disclosure relates to an apparatus and a method for three-dimensionally modeling an organ through image segmentation.

2. Description of Related Art

Biomimetics is a technology for mimicking an organ inside a human body, such as a heart, a lung, or the like. Biomimetics is in the spotlight as technology capable of remedying shortcomings of existing clinical tests relying on experiments on cultured cells or animals A system capable of producing an internal organ, similar to a real human body internal organ, through biomimetics and replicated a surrounding environment to operate the organ as normal is implemented, and then, a clinical test is performed, thereby providing safety, reflecting a physiological environment for actual operations on the human bodily organ more accurately, and solving problems related to ethical issues, expenses, time, inaccuracy in experimental results, and the likes generated in animal experiments.

Mimetics requires modeling and rendering techniques to accurately copy an organ in a 3D shape to be similar to a real organ. Modeling refers to an act of creating a three-dimensional model in a virtual space inside a computer using computer graphics, and mainly uses a 3D graphics tool. A modeled three-dimensional model is stored as data that is not an actual object. Rendering refers to a process of creating an image from the model using a computer program.

Image segmentation refers to a process of dividing a digital image into a plurality of pixel or voxel sets. The purpose of segmentation is to simplify or translate representation of an image to be more meaningful and interpreted. Image segmentation is used to find an object and a boundary within the image. The result of segmentation is a set of regions collectively containing the entire image, or a set of contours extracted from the image.

SUMMARY

The present disclosure has been made to solve the above-mentioned problems occurring in the prior art, and an object in an aspect of the present disclosure is to provide an apparatus and a method for three-dimensionally modeling an organ through image segmentation.

More specifically, it is an object to provide an apparatus and a method for three-dimensionally modeling an organ through image segmentation, which can minimize manual work and post-processing required in a biological organ modeling process and quickly process the same by using a computer program.

It is another object to provide a method and a program for modeling a three-dimensional organ shape, which can minimize a difference among parts of an organ during the biological organ modeling process, and accurately model the three-dimensional organ shape to be similar to an actual organ.

The aspects of the present disclosure are not limited to those mentioned above, and other aspects not mentioned herein will be clearly understood by those skilled in the art from the following description.

To accomplish the above objects, in an aspect of the present disclosure, there is provided a method for three-dimensionally modeling an organ through image segmentation including the operations of: receiving one or more pieces of medical image data for a specific bodily organ of a target object; setting a region of interest with respect to the bodily organ based on the one or more pieces of medical image data; forming one or more blocks corresponding to the region of interest, wherein the blocks include a portion of the bodily organ corresponding to the regions of interest; setting a segment algorithm for each of the blocks; generating first image data respectively performing 3D modeling of portions contained in the blocks based on algorithms set to the blocks; and merging the first image data, and generating a three-dimensional section image data with respect to the entire bodily organ.

In an embodiment of the present disclosure, the operation of setting the region of interest recognizes types of the bodily organ based on a deep learning-based first model, and automatically generates a region of interest corresponding to types of the bodily organ.

In an embodiment of the present disclosure, the merging is performed through image registration, and the image registration is performed through at least one among a feature element registration and a template-based registration.

In an embodiment of the present disclosure, in a case in which there is an overlapping region between the blocks, in operation of generating the first image data, the body portion contained in the overlapping region is explored based on segmentation algorithms set to the blocks.

In an embodiment of the present invention, the operation of setting the regions of interest includes the operations of: segmenting the region of interest into a first region corresponding to a blood area of the bodily organ and a second region corresponding to a muscle area of the bodily organ; setting the first region and the second region as regions of interest. In operation of segmenting, based on the one or more pieces of medical image data, the bodily organ is identified as the first region corresponding to a blood region when a contrast value of the bodily organ is a predetermined first value or more, and is identified as the second region corresponding to the muscle region when a contrast value of the bodily organ is a predetermined second value or less.

In another aspect of the present invention, provided is a three-dimensional modeling apparatus of an organ through image segmentation an organ through image segmentation, the three-dimensional modeling apparatus sets a region of interest with respect to the bodily organ based on the one or more pieces of medical image data, forms one or more blocks corresponding to the region of interest, wherein the blocks include a portion of the bodily organ corresponding to the regions of interest, sets a segment algorithm for each of the blocks; generates first image data respectively performing 3D modeling of portions contained in the blocks based on algorithms set to the blocks; and merges the first image data, and generates a three-dimensional section image data with respect to the entire bodily organ. Each of the blocks contains a portion of the bodily organ corresponding to the region of interest.

In an embodiment of the present disclosure, in a case in which there is an overlapping region between the blocks, the body portion contained in the overlapping region is discriminated based on segmentation algorithms set to the blocks.

In an embodiment of the present disclosure, setting the region of interest is that the processor automatically creates a region of interest corresponding to a type of the bodily organ by recognizing the type of the bodily organ based on a deep learning-based first model in the one or more pieces of medical image data.

In an embodiment of the present disclosure, the image registration is performed through at least one among a feature element registration and a template-based registration.

In another aspect of the present invention, a program for three-dimensional modeling of an organ through image segmentation is connected to a computer, which is hardware, and is stored in a medium to execute the three-dimensional modeling method of an organ through image segmentation.

Other detailed matters of the present disclosure are contained in the detailed description and drawings.

DETAILED DESCRIPTION

Figure 1:
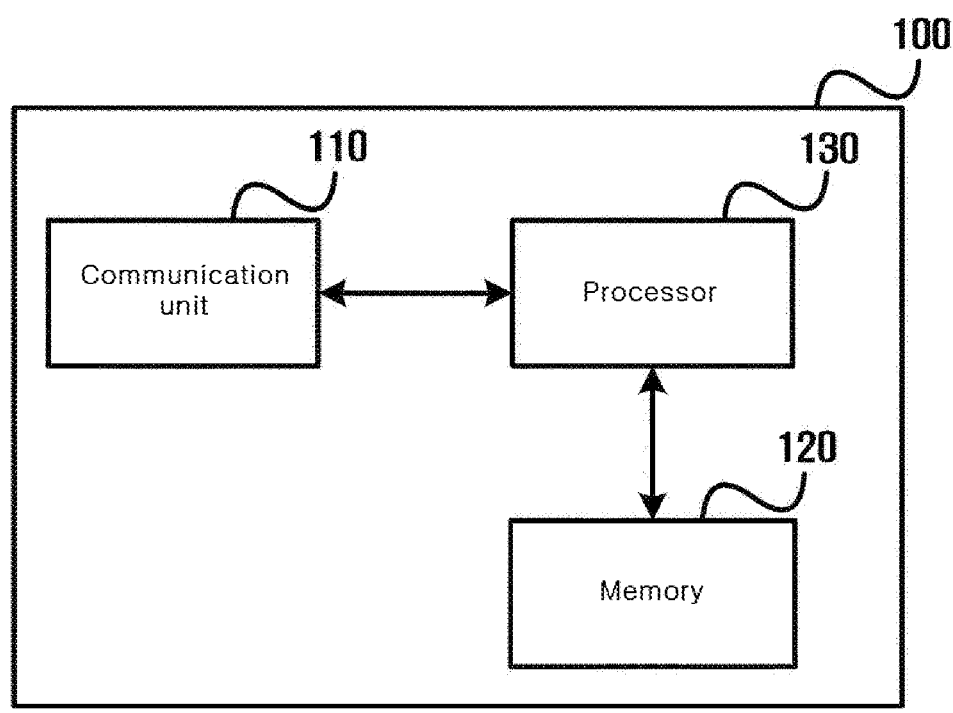
FIG. 1 is a block diagram of a three-dimensional modeling apparatus of an organ through image segmentation according to an embodiment of the present disclosure.

Advantages and features of the present disclosure and methods accomplishing the advantages and features will become apparent from the following detailed description of exemplary embodiments with reference to the accompanying drawings. However, the present disclosure is not limited to exemplary embodiment disclosed herein but will be implemented in various forms. The exemplary embodiments are provided so that the present disclosure is completely disclosed, and a person of ordinary skilled in the art could fully understand the scope of the present disclosure. Therefore, the present disclosure will be defined only by the scope of the appended claims.

Terms used in the specification are used to describe specific embodiments of the present disclosure and are not intended to limit the scope of the present disclosure. In the specification, terms having a singular form may include plural forms unless otherwise specified. It should be also understood that the terms of 'include' or 'have' in the specification are used to mean that there is no intent to exclude existence or addition of other components besides components described in the specification. In the detailed description, the same reference numbers of the drawings refer to the same or equivalent parts of the present disclosure, and the term "and/or" is understood to include a combination of one or more of components described above. It will be understood that terms, such as "first" or "second" may be used in the specification to describe various components but are not restricted to the above terms. The terms may be used to discriminate one component from another component. Therefore, of course, the first component may be named as the second component within the scope of the present disclosure.

The term "exemplary" is used herein as the meaning of "used as an example or an illustration". It should be understood that any of the embodiments described herein as "exemplary" should not necessarily be construed as being preferred or having advantages over other embodiments.

The term, "unit", used in the present disclosure means a hardware element, such as software, FPGA, or ASIC, and the "unit" performs some roles. However, the term, "unit", is not limited to software or hardware. The "unit" may be configured in an addressable storage medium or may be configured to play one or more processors. Therefore, as an example, a "unit" includes elements, such as software elements, object-oriented software elements, class elements, and task elements, processes, functions, attributes, procedures, subroutines, segments of program codes, drivers, firmware, microcode, circuits, data, databases, data structures, tables, arrays, and variables. Functions provided within the elements and "units" may be combined with a smaller number of elements and "units" or may be further divided into additional elements and "units".

In addition, all "units" in the present disclosure may be controlled by at least one processor, and the at least one processor may perform the operation performed by the "unit" of the present disclosure.

Embodiments of the present disclosure may be described in terms of a function or a block performing the function. A block which may be referred to as a "unit" or a "module" of the present disclosure can be physically implemented by an analog or digital circuit, such as a logic gate, an integrated circuit, a microprocessor, a microcontroller, a memory, a passive electronic component, an active electronic component, an optical component, or hardwired circuits, etc., and may be selectively operated by firmware and software.

Embodiments according to the present disclosure can be implemented using at least one software program executed on at least one hardware device, and can perform a network management function to control elements.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Terms, such as "below," "beneath," "lower," "above," "upper," and the like, which have spatially relative concepts, may be used to facilitate correlation between one component and other components, as illustrated in the drawings. Such spatially relative terms should be understood as terms including different directions of components during use or operation, in addition to the direction illustrated in the drawings. For example, if the components illustrated in the drawings are turned upside down, the components described as "below" or "beneath" may be placed "above" of other components. Thus, the exemplary term "under" may include all of the directions, "below" and "above". The components may be oriented in other directions, so that the spatially relative terms can be interpreted according to the orientation.

The term "organ" herein may include the heart, the stomach, the liver, the lungs, the lymph nodes, the teeth, the eyes, the thyroid gland, the ovaries, the skin, the brain, and the like, but is not limited thereto. The term "organ" may a portion or an entire portion of any organ constituting a specific object, for instance, a human body or an animal's body.

In this specification, the term "segmentation" refers to a task of finding an object and a boundary in an image. For example, the segmentation may be a task of adjusting a brightness value to find and visually distinguish a target portion and a boundary, but is not limited thereto.

In this specification, "medical image data" includes magnetic resonance imaging (MRI), computerized tomography (CT), positron emission tomography (PET), and ultrasonography, but is not limited thereto, and includes all image data capturing a patient's body for medical purposes.

Hereinafter, preferred embodiments of the present disclosure will be described in detail with reference to the accompanying drawings.

FIG. 1 is a block diagram of a three-dimensional modeling apparatus 100 of an organ through image segmentation according to an embodiment of the present disclosure.

According to an embodiment of the present disclosure, the three-dimensional modeling apparatus 100 of an organ through image segmentation includes a communication unit 110, a memory 120, and a processor 130.

The three-dimensional modeling apparatus 100 of an organ through image segmentation may include all kinds of electronic devices capable of installing and executing an application related to an embodiment of the present disclosure, and may be one of electronic devices, such as a computer, an ultra mobile PC (UMPC), a workstation, a netbook, a personal digital assistant (PDA), a portable computer, a web tablet, a wireless phone, a mobile phone, a smart phone, and a portable multimedia player (PMP). The electronic device may perform all kinds of services, such as configuration of a service screen, data input, data transmission/reception, data storage, etc. under control of an application.

The three-dimensional modeling apparatus 100 of an organ through image segmentation can obtain medical image data through a communication unit 110. Here, the medical image data may include an MRI image or a CT panoramic image.

The memory 120 according to the present disclosure is a local storage medium capable of storing first image data and second image data extracted by the medical image data and the processor 130. If necessary, the processor 130 may use the data stored in the memory 120. In addition, the memory 120 according to the present disclosure may store instructions, programs, or applications for operating the processor 130.

In addition, the memory 120 according to the present disclosure may be provided with a writable non-volatile memory capable of saving data even if power supplied to the three-dimensional modeling apparatus is cut off and reflecting changes. That is, the memory 120 may be any one of a flash memory, an EPROM, and an EEPROM. For convenience of description, it is described that all instruction information is stored in one memory 120, but the present disclosure is not limited thereto. The three-dimensional modeling apparatus 100 of an organ through image segmentation may include a plurality of memories.

According to an embodiment of the present disclosure, the processor 130 three-dimensionally models a specific organ contained in the medical image data based on the medical image data obtained through the communication unit 110 or the medical image data stored in the memory 120. This will be described in detail later.

Meanwhile, in one embodiment of the present disclosure, the processor 130 may merge the plurality of pieces of first image data generated through the three-dimensional modeling of the core organ included in each block to obtain second image data. In this instance, the second image data may be data containing the entire region of interest for the organ contained in the medical image data.

The embodiments described with respect to the three-dimensional modeling apparatus 100 of an organ through image segmentation are applicable to at least some or the entire of a three-dimensional modeling method of an organ through image segmentation. In contrast, embodiments described with respect to the three-dimensional modeling method of an organ through image segmentation are applicable to at least some or the entire of the three-dimensional modeling apparatus 100 of an organ through image segmentation. Furthermore, the three-dimensional modeling method of an organ through image segmentation according to the disclosed embodiments may be performed by the three-dimensional modeling apparatus 100 of an organ through the image segmentation disclosed in the present specification, but the embodiments thereof are not limited thereto, and may be performed by various types of electronic devices.

Hereinafter, a three-dimensional modeling process of an engine through image segmentation according to the present disclosure will be described in detail with reference to FIGS. 2 to 7. All of operations of the apparatus 100 described below are equally applicable to the processor 130 which controls the overall operation of the apparatus 100.

Figure 2:
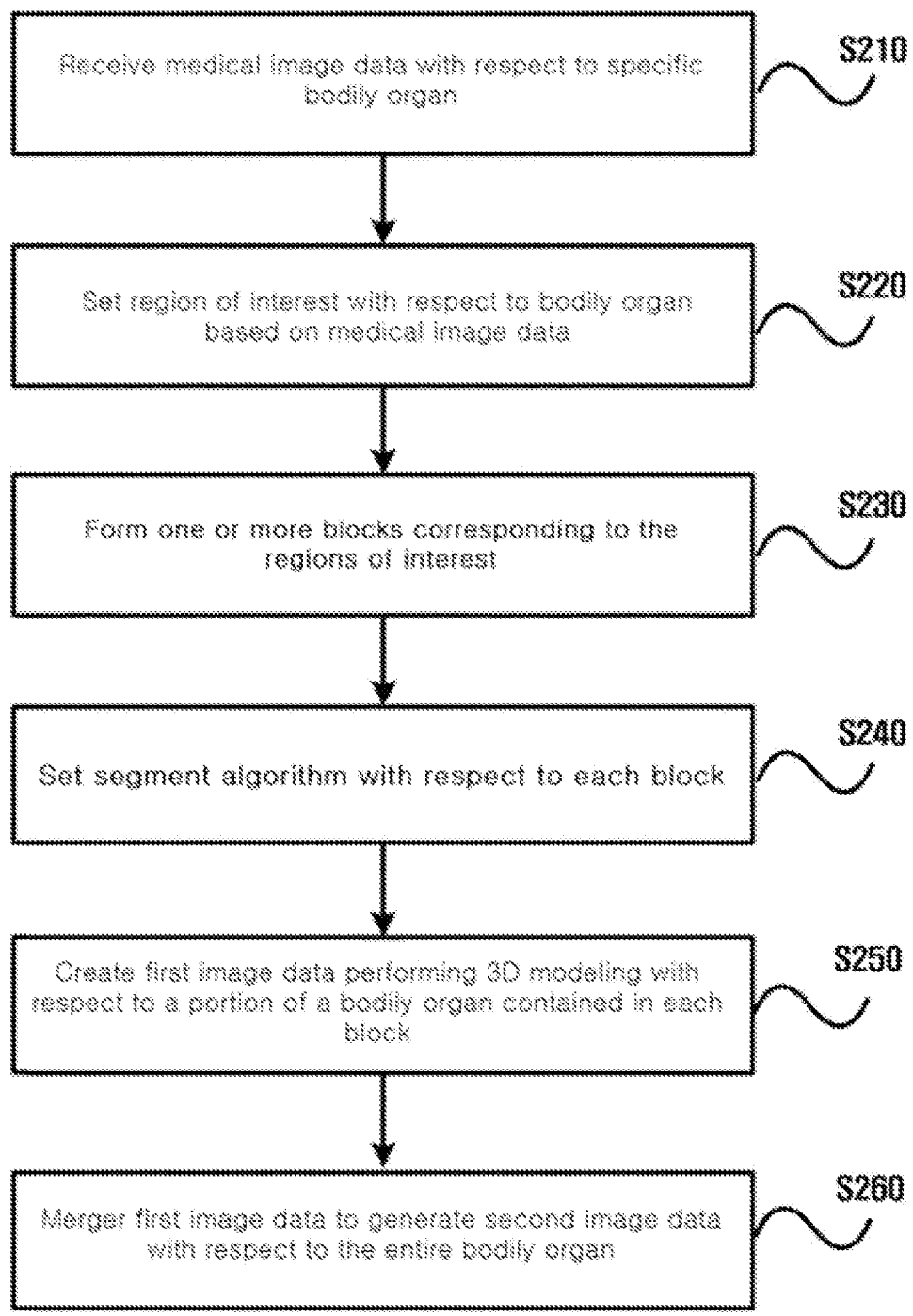
FIG. 2 is a flowchart illustrating a three-dimensional modeling method of an organ through image segmentation according to an embodiment of the present disclosure.
Figure 3:
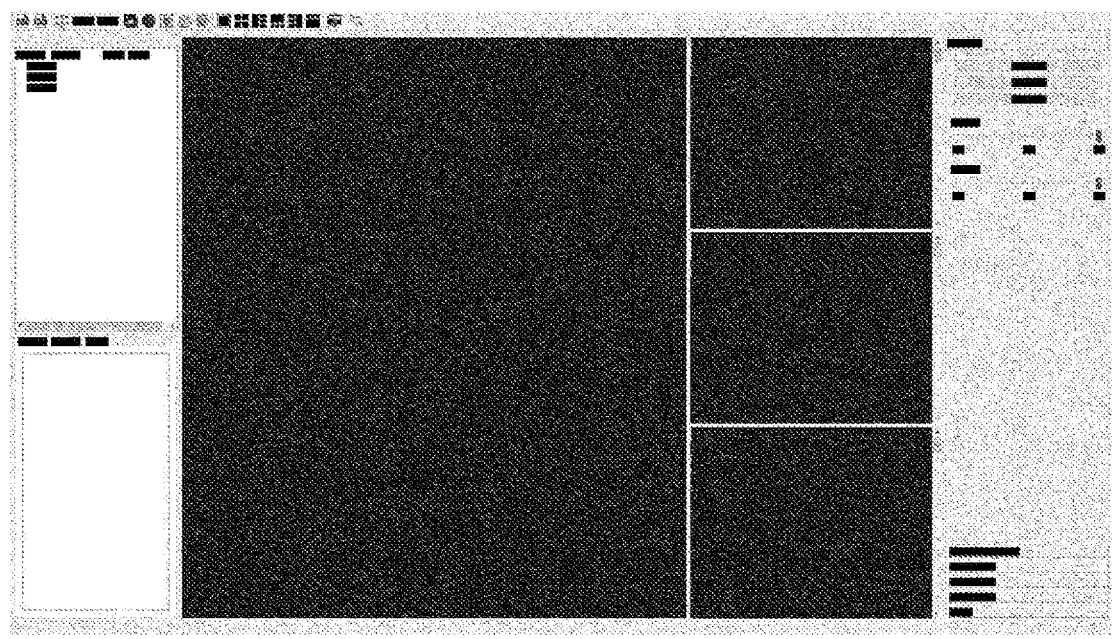
FIG. 3 is a schematic view illustrating a basic screen of a program for modeling a three-dimensional organ shape according to an embodiment of the present disclosure.

FIG. 2 is a flowchart illustrating a three-dimensional modeling method of an organ through image segmentation according to an embodiment of the present disclosure, and FIG. 3 is a schematic view illustrating a basic screen of a program for modeling a three-dimensional organ shape according to an embodiment of the present disclosure.

Referring to FIG. 3, the basic screen may include a layer on which the entire shape of the bodily organ of the object is displayed and a layer for displaying an image of each of the three planes, such as an axial plane, a coronal plane, and a sagittal plane.

First, referring to FIG. 2, the processor 130 receives medical image data for a specific bodily organ of an object (S210).

The medical image data includes computed tomography (CT) data or Magnetic resonance imaging (MRI) data. However, the present disclosure is not limited thereto.

The CT data is data capturing a cross section of an internal body of a human body through computed tomography (CT) using a CT scanner.

The MRI data is data captured through magnetic resonance imaging (MRI), namely, through a high-tech biomedical machine or an imaging method made by the machine using a magnetic field generated by magnetism.

The CT data or the MRI data is utilized as basic data of a process of three-dimensionally modeling a bodily organ. That is, segmentation and rendering are performed on the basis of the input CT data or MRI data to three-dimensionally model an organ shape.

Referring to FIG. 2, based on the medical image data received through the communication unit 110 of the apparatus, the processor 130 sets the region of interest around the bodily organ (S220).

A region of interest (ROI) is a range of an organ, a tissue, or a portion thereof to be measured, through the image processing method. The region of interest (ROI) may be set to a two-dimensional volume of interest or a three-dimensional volume of interest (VOI).

In operation S220, when a region of interest with respect to the bodily organ is set, the processor 130 forms and outputs one or more blocks corresponding to the region of interest (S230). In one embodiment of the present disclosure, each of the blocks includes a portion of the bodily organ corresponding to the region of interest.

Figure 4:
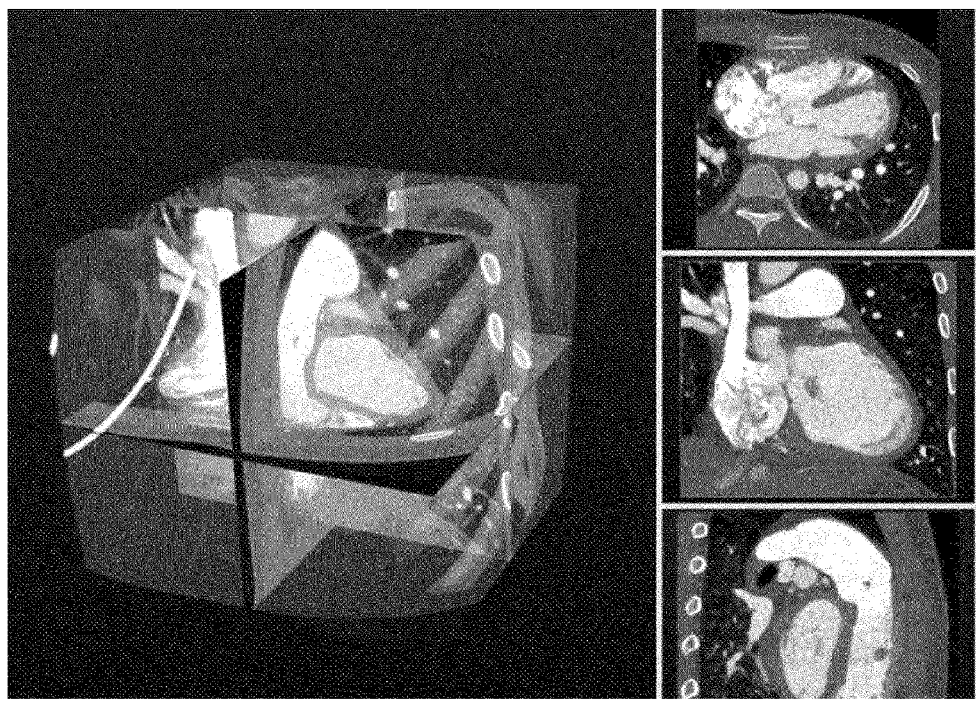
FIG. 4 is a schematic view illustrating a state in which one or more blocks including a region of interest is formed and output according to an embodiment of the present disclosure.

FIG. 4 is a schematic view illustrating a state in which one or more blocks including a region of interest is formed and output according to an embodiment of the present disclosure.

In operation (S230), the processor 130 forms a block corresponding to each of the one or more regions of interest set in operation S220 and visually displays the region of interest.

Referring to FIG. 4, in one embodiment of the present disclosure, the block may be formed in a cube shape, but is not limited thereto. It is also possible that the block may be formed in a shape having a curve, for instance, a globular shape or a cube shape partially having a curve. FIG. 4 illustrates a state in which the CT data of the heart is input and the plurality of regions of interest are set to form and output four blocks 200a, 200b, 200c and 200d with respect to each of the regions of interest. In the drawing, for convenience, four cube-shaped blocks are illustrated, but the shape and the number of blocks are not limited.

For example, assuming that the set region of interest is a human heart, one or more cube-shaped blocks corresponding to the heart are output to a user's device. Each of the cube-shaped blocks includes the entire or a portion of the heart organ. Specifically, each block may be formed to include the left atrium, the left ventricle, the right atrium, the right ventricle, the aorta, the pulmonary artery, the vein, the aortic valve, the pulmonary valve, the tricuspid valve, the mitral valve, the coronary artery, and the like.

In one embodiment of the present disclosure, the apparatus may provide a user with an interface capable of adjusting the size and location of the block to include an region of interest. Meanwhile, there is no limitation in the number of blocks, and a plurality of blocks may be formed for the plurality of regions of interest. Moreover, the plurality of formed blocks may be different in the size, angle, and location.

Referring to FIG. 4, the size of each block may be adjusted based on an axis for three planes, such as an axial plane, a coronal plane, and a sagittal plane. In addition, as described above, it is possible that an overlapping region between the blocks may exist, or it is possible to move and rotate the block if necessary.

In other embodiments, the blocks may be created and arranged to have an area where the block overlaps with another block. Portions contained in most organs are not configured to be perfectly separated based on one cross-section but are configured in various forms and combinations. Therefore, in a case in which a block for each portion set as the region of interest is formed, an overlapping region may occur. Since the blocks of the present disclosure can be formed to be overlapped, it is possible to more accurately set the region of interest by each portion and form a block. In addition, it is possible to more accurately and precisely perceive a tissue (for instance, a valve of the heart) located on a boundary surface of each portion.

In another embodiment, the block may be configured to be rotatable. That is, the block can be configured to rotate around a specific axis according to the operation of the system. Accordingly, a region of interest can be more accurately set with respect to each portion of an organ of a complex shape.

In this instance, the block according to an embodiment of the present disclosure can be automatically generated by using an artificial intelligence technique with respect to each region of interest. According to each of organs, it is possible that portions primarily set as regions of interest may be input. Based on the medical image data through machine learning and deep learning, the type of the bodily organ is identified, the region of interest corresponding to the type of the bodily organ is automatically set, and the block for the corresponding region of interest can be automatically formed and displayed.

In detail, when the medical image data is input to a first model based on deep learning, a bodily organ of an object included in the medical image data is identified, a region of interest is set, and a plurality of blocks are formed and output according to the corresponding region of interest. In a case in which the object organ is the heart, regions of interest with respect portions of the left atrium, the left ventricle, the right atrium, the right ventricle, the aorta, the pulmonary artery, the vein, the aortic valve, the pulmonary valve, the tricuspid valve, the mitral valve, the coronary artery, and the like are automatically set, and blocks for the corresponding regions of interest are automatically formed and displayed.

In one embodiment of the present disclosure, in a case in which the bodily organ is the heart organ, the processor 130 may extract location information of the valve of the heart organ and set a region of interest based on the location information of the valve.

Specifically, the processor 130 identifies the tricuspid, the pulmonary valve, the mitral valve, and the aortic valve, and extracts location information of each valve. Then, four regions of interest are set on the basis of the location information of each valve. In this instance, the four regions of interest may be respectively set corresponding to the left atrium, the left ventricle, the right atrium, and the right ventricle.

Although not illustrated in the drawings, in one embodiment of the present disclosure, the processor 130 may set the regions of interest for the bodily organ in such a way as to divide the bodily organ into a first region corresponding to a blood region and a second region corresponding to a muscle region of the bodily organ and to set the first region and the second region as regions of interest with respect to the bodily organ. In this instance, in operation of dividing the bodily organ into the first region and the second region, based on the medical image data, the bodily organ is identified as the first region corresponding to the blood region when a contrast value of the bodily organ is a predetermined first value or more, and is identified as the second region corresponding to the muscle region when a contrast value of the bodily organ is a predetermined second value or less. In this instance, the first value may be set to be higher than the second value. However, the present disclosure is not limited thereto, and the first value and the second value may be set to be equal.

For instance, assuming that the bodily organ is the heart and the medical image data is CT data for the heart, a blood (lumen) region in the heart is captured in a state in which a contrast medium is injected for CT imaging. Therefore, the blood region in the medical image data has a high contrast value as being brighter than the muscle region. Therefore, in a case in which the contrast value is a predetermined first value or more, the bodily organ is identified as the blood region of the heart organ, and in a case in which the contrast value is a predetermined second value or more, the bodily organ is identified as the muscle region of the heart organ so that the bodily organ can be divided. The blood region (first region) and the muscle region (second region) divided may be respectively set as regions of interest for the heart organ. In this instance, in one embodiment of the present disclosure, the muscle region, which is the second region of the heart organ, may be reset as four regions of interest on the basis of location information of the valve.

Referring to FIG. 2, after operation (S230), the apparatus sets segmentation algorithms for the blocks (S240).

The segmentation algorithm means an algorithm adjusting specific variables of the data, for instance, Hounsfield un (HU), a contrast value, a brightness value, and the like, based on a set reference value. The segmentation algorithm is used to explore or highlight a boundary of a portion of the bodily organ that includes blocks for regions of interest.

Meanwhile, in an embodiment of the present disclosure, in operation of generating the first image data, the bodily organ including the blocks may be three-dimensionally modeled based on the segmentation algorithm set in the blocks. That is, the present disclosure can accurately and precisely model the bodily organ by setting variables, contrast values, and the likes of the segmentation algorithm applied to a portion of the bodily organ including each block, setting 3D modeling environment optimized to the block, and simultaneously performing 3D modeling for a portion of the bodily organ contained in each block.

Additionally, in an embodiment of the present disclosure, the segmentation algorithm can be differently set and applied according to each block. That is, in a case in which a plurality of blocks are formed, the blocks perform segmentation work for a region of interest included in the corresponding block on the basis of a segmentation algorithm set in each of the blocks. Accordingly, the segmentation algorithm optimized for portions in spite of the same organ can be applied, thereby more quickly and accurately modeling a three-dimensional organ shape.

For example, assuming that the organ of the object is the heart of a human body, the heart is changed in shape and form according to the diastole and systole. In addition, contraction and relaxation of the heart change placement and an amount of blood flow of blood in the heart. Furthermore, according to movement of a contrast medium, which is injected to a human body such that a specific tissue or blood vessel is well seen during an inspection or a procedure, brightness can be photographed differently by portions of the heart.

Figure 5:
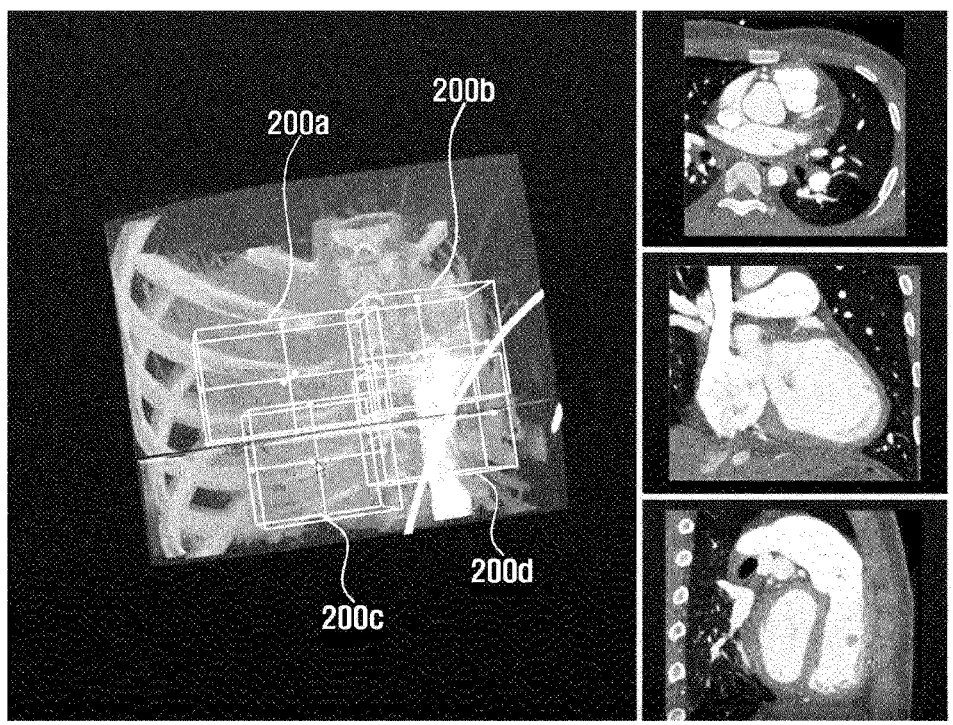
FIG. 5 is a schematic view illustrating a state in which a three-dimensional modeling of all images with respect to the entire heart, which is a target organ is carried outer.

FIG. 5 is a schematic view illustrating a state in which a three-dimensional modeling of all images with respect to the entire heart, which is a target organ is carried outer.

Referring to FIG. 5, since one segmentation algorithm is applied to the entire image, it is confirmed that accurate segmentation work is not performed for each portion of the heart.

That is, in order to three-dimensionally model the entire heart, in a case in which one algorithm is applied, it is difficult to accurately model the entire heart. In order to solve the problem, the conventional art performs 3D modeling after extracting a blood portion in the heart and segmenting portions of the heart, namely, the left atrium, the left ventricle, the right atrium, the right ventricle, the aorta, the pulmonary artery, the vein, the aortic valve, the pulmonary valve, the tricuspid valve, the mitral valve, the coronary artery, and the like. Especially, for three-dimensional modeling of a region where it is difficult to identify in the medical image data, manual work and post-processing are required. Such a conventional art is varied in quality of results according to individual proficiency, and requires lots of time.

In order to solve the above problems, the present disclosure forms blocks by portions of an organ, for instance, the left atrium, the left ventricle, the right atrium, the right ventricle, the aorta, the pulmonary artery, the vein, the aortic valve, the pulmonary valve, the tricuspid valve, the mitral valve, the coronary artery, and the like, sets a segment algorithm applied to each block, and simultaneously performs segmentation work for the plurality of portions. Therefore, the present disclosure can show 3D modeling of an organ accurately and quickly.

Meanwhile, in one embodiment of the present disclosure, in operation of creating the first image data, in a case in which there is an overlapping region between the blocks, the present disclosure explores the body portion contained in the overlapping region, based on the segmentation algorithm set in each of the blocks.

In detail, in the case in which there is an overlapping region between the blocks generated by the apparatus, the present disclosure explores a target portion by applying the segmentation algorithm set in each of the blocks. Moreover, it is possible to accurately analyze portions located in the overlapping region of the blocks by utilizing Boolean operation with respect to data obtained from the blocks. That is, Boolean operators, for instance, AND, OR, NOT, XOR, and the like, with respect to the data obtained from the blocks are applied to logically analyze and explore the portions located in the overlapping region.

In detail, in a case in which the target organ is the heart, a valve existing in the overlapping region of the blocks formed in the atrium and the ventricle can be accurately modeled. In another embodiment, in a case in which a boundary of the region of interest is comprised of muscles having different thickness by regions, a block is formed such that the boundary comprised of the corresponding muscles is located in the overlapping region of the blocks, and 3D modeling is performed to be the same as the actual organ by applying the algorithm specialized to the blocks.

Referring to FIG. 2, the apparatus generates a first image data that applies 3D modeling to portions contained in each block, based on the algorithm set to each block (S250).

In this instance, in order to generate the first image data, volume rendering and surface rendering for a portion of the bodily organ contained in each block are performed. Detailed description of the rendering method will be omitted since being well-known technology.

Figure 6:
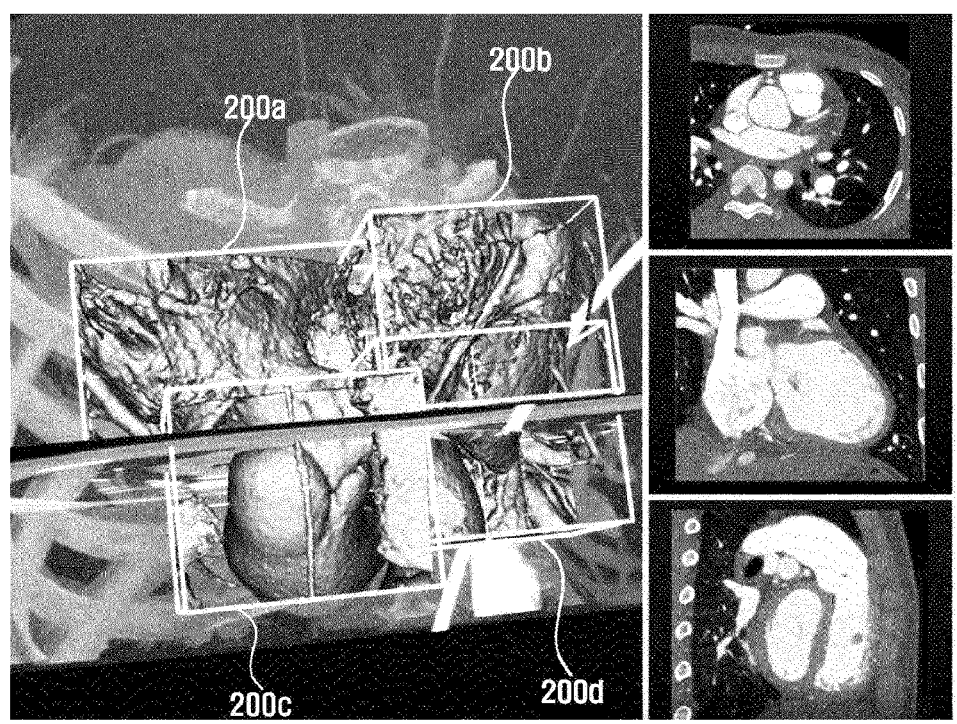
FIG. 6 is a schematic view illustrating a state in which first image data of 3D modeled portions contained in each block is generated, on the basis of a segmentation algorithm set for each block according to an embodiment of the present disclosure.

FIG. 6 is a schematic view illustrating a state in which first image data of 3D modeled portions contained in each block is generated, on the basis of a segmentation algorithm set for each block according to an embodiment of the present disclosure.

FIG. 6 illustrates a state in which segmentation work is simultaneously performed to four blocks 200a, 200b, 200c and 200d formed in the regions of interest of the target organ.

A segmentation algorithm optimized to the image data for the regions of interest contained in each block is set. The segmentation algorithms respectively set to the blocks may be equal or different.

The segmentation work is performed based on the segmentation algorithm set to each block. That is, variables or reference values adjusted according to the set segmentation algorithm may be applied differently. Therefore, differentiated algorithms may be applied according to portions even in the same organ without additional operation since portions of the organ can be segmented. Accordingly, the present disclosure can perform modeling of a 3D organ shape quickly and accurately by performing segmentation work at the same time.

Referring to FIG. 2, when a plurality of pieces of first image data are generated by three-dimensionally modeling portions of the bodily organ contained in the blocks, the first image data are merged to generate 3D second image data for the entire bodily organ (S260).

Figure 7:
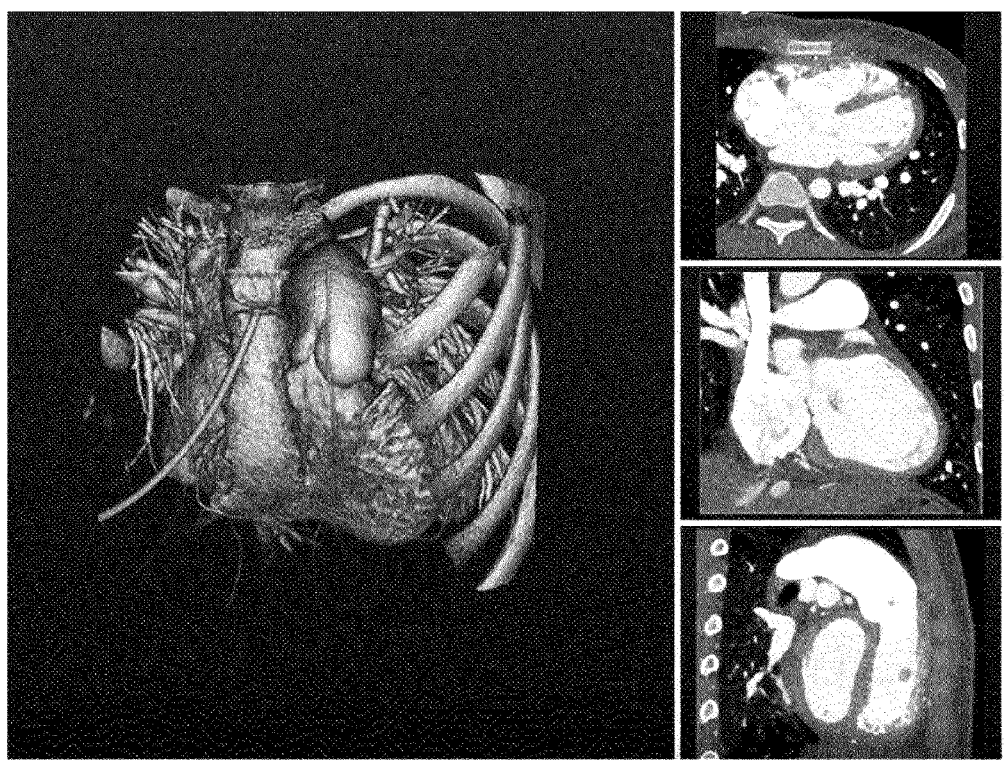
FIG. 7 is a schematic view illustrating a state in which second image data of a 3D image with respect to the entire heart is generated by merging the first image data.

FIG. 7 is a schematic view illustrating a state in which second image data of a 3D image with respect to the entire heart is generated by merging the first image data.

Referring to FIGS. 6 and 7, the processor 140 merges the four pieces of first image data generated for the four blocks 200a, 200b, 200c, and 200d to generate 3D second image data for the entire heart organ.

Specifically, the processor 120 merges the plurality of pieces of second image data to generate second image data. Specifically, the processor 140 may generate second image data through image registration.

The image registration means technology for obtaining a cross-sectional shape of a region of interest from the first image data and moving and superimposing the same to one reference coordinate.

According to an embodiment of the present disclosure, the image registration may include feature element matching of extracting and registering important features of an image or template-based registration of comparing a certain region in the image with a designated template and distinguishing an area having the highest similarity.

The feature element registration may have four stages of feature extraction, feature matching between feature elements, transformation model estimation, and image registration.

Furthermore, the feature matching includes an intensity-based matching method, such as cross-correlation (CC), mutual information (MI), least-squares matching (LSM), or the like, and a feature-based matching method, such as scale-invariant feature transform (SIFT), speeded up robust features (SURF), or the like.

According to an embodiment of the present disclosure, in a case in which the feature-based matching method is used for the image registration, an axis of the first image data is aligned. In one embodiment, the axis of the image data refers to X, Y, and Z axes in a three-dimensional space.

In addition, the size and position of each image can be adjusted by extracting and matching a plurality of feature points from the plurality of pieces of first image data. In one embodiment, the feature point includes a specific point in which the position in the three-dimensional space does not change according to a patient's condition change, for instance, breathing.

In one embodiment, the feature extraction may be implemented by an artificial intelligence algorithm including machine learning or deep learning.

When the plurality of feature points are extracted, the sizes and locations of the first image data are matched and merged based on the distances or locations between the plurality of feature points to generate the second image data.

Meanwhile, the 3D modeling data of the organ generated according to an embodiment of the present disclosure can be materialized and output by a three-dimensional printer or a 3D printing method. The output result can be used for surgical training and surgical simulation.

In the present disclosure, various embodiments through the processor 130 may be implemented using a machine learning model. As an example, a deep neural network (DNN) of the present disclosure may include a system or network for constructing one or more layers in one or more computers to perform determination based on a plurality of pieces of data.

The deep neural network may be implemented as a set of layers including a convolutional pooling layer, a locally-connected layer, and a fully-connected layer.

The convolutional pooling layer or the locally-connection layer may be configured to extract features in the image.

The fully-connected layer may determine a correlation between features of the image.

As another example, the overall structure of the deep neural network of the present disclosure may be formed in a form in which the locally-connection layer is connected to the convolutional pooling layer and the fully-connected layer is connected to the locally-connection layer. The deep neural network may include various determination criteria, namely, parameters, and may add new decision criteria, namely, parameters, through input image analysis.

The deep neural network according to embodiments of the present disclosure is a convolutional neural network suitable for image analysis, and has a structure in which a feature extraction layer of learning features with the greatest discriminative power from given image data on its own and a prediction layer of learning a prediction model to show the height prediction performance based on the extracted features are integrated.

The feature extraction layer may be formed in a structure in which the convolutional layer making a feature map by applying a plurality of filters to each region of the image and a pooling layer capable of extracting features immutable to changes in location or rotation by spatially integrating the feature map are repeated several times in turn. So, features of various levels ranging from features of a low level, such as a dot, a line, a side, and the like, to features of a high level which is complicated and meaningful can be extracted.

The convolutional layer takes a non-linear activation function to an inner product of a local receptive field and a filter for each patch of the input image to obtain a feature map. Compared with another network structure, CNN uses a filter having sparse connectivity and shared weights. Such a connection structure reduces the number of parameters to be learned and provides effective learning through a back-propagation algorithm to finally enhance prediction performance.

The Pooling layer or sub-sampling layer generates a new feature map using the local information of the feature map obtained from the previous convolutional layer. In general, the feature map newly created by the integrated layer is reduced to a size smaller than that of the original feature map, and a representative integration method includes maximum pooling selecting a maximum value of the corresponding area in the feature map, and average pooling obtaining an average value of the corresponding area in the feature map. The feature map of the pooling layer may be less affected by the location of any structure or pattern existing in the input image than the feature map of the previous layer. That is, the pooling layer can extract features robust to local changes, such as noise or distortion, in the input image or the previous feature map, and this feature can play an important role in classification performance. The role of another pooling layer is to reflect features of a wider region as ascending to a learning layer of a higher level in the deep structure. As the feature extraction layer are stacked, a lower layer reflects local features, and an upper layer reflects features of the overall abstract image as ascending toward upper layers.

As described above, the classification model, such as multi-layer perception (MLP) or a support vector machine (SVM), can be connected in the form of a fully-connected layer to be used for classification model learning and prediction.

Moreover, according to one embodiment of the present disclosure, the learning data for machine learning may be generated based on a U-Net-dhSegment model. Here, the U-Net-dhSegment model sets an expansive path to be symmetric with a contracting path based on fully convolutional networks (FCNs) of end-to-end to generate a U-shaped architecture having skip connection for each level.

Additionally, the learning data for the machine learning model may include medical image data, first image data, and second image data.

Accordingly, the processor 140 can perform the 3D modeling process of an organ through the image segmentation described above in FIGS. 2 and 7 by using the machine learning model learned through the learning data.

According to the present disclosure, one or more blocks are designated with respect to regions of interest of an organ and algorithms optimized for the blocks are applied, thereby reducing manual work and post-processing. Furthermore, segmentation can be simultaneously performed with respect to the plurality of regions of interest, thereby quickly performing modeling of an organ. In addition, the present disclosure applies differentiated algorithms to each of the blocks arranged in the regions of interest of an organ, thereby accurately and precisely performing modeling work with respect to a complicated organ.

Various embodiments of the present disclosure may be implemented as software including one or more instructions stored in a storage medium, for instance, a memory, readable by a machine, such as a 3D modeling apparatus 100 of an organ through image segmentation, or a computer. For example, a processor of an apparatus, for instance, the processor 140, can call one or more commands among one or more instructions stored in the storage medium, and execute it. This enables the apparatus to perform at least one function in accordance with the one or more instructions called. The one or more instructions may include a code generated by a compiler or a code that may be executed by an interpreter. The machine-readable storage medium may be provided in the form of a non-transitory storage medium. Here, the term "non-transitory storage medium" is a tangible device and does not include a signal, for example, electromagnetic wave, and the term does not distinguish a case in which data is stored semi-permanently in the storage medium and a case in which data is stored temporarily in the storage medium. For example, the non-transitory storage medium may include a buffer in which data is temporarily stored.

According to one embodiment, the method according to various embodiments disclosed herein may be included in a computer program product. The computer program product may be transacted between a seller and a buyer. The computer program product may be distributed in the form of a machine readable storage medium, for instance, a compact disc read only memory (CD-ROM)), or may be distributed, for example, downloaded or uploaded, through an application store, such as Play Store™, or directly between two user devices, such as smart phones, online. In a case of online distribution, at least a portion of computer program products, for instance, downloadable apps, is temporarily stored or temporarily generated in a machine-readable storage medium, such as a memory of a server of a manufacturer, a server of an application store, or a relay server. The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

The invention claimed is:

1. A method for three-dimensionally modeling an organ through image segmentation comprising:
   receiving a plurality of pieces of medical image data for a specific bodily organ of a target object;
   setting a region of interest with respect to the bodily organ based on the plurality of pieces of medical image data;
   forming a plurality of three-dimensional (3D) cube-shaped blocks corresponding to the region of interest, wherein each of the plurality of 3D cube-shaped blocks includes a portion of the bodily organ corresponding to the regions of interest;
   setting a respective segment algorithm for a respective 3D cube-shaped block of the plurality of 3D cube-shaped blocks;
   generating 3D first image data by simultaneously performing a plurality of segmentation works for the plurality of 3D cube-shaped blocks with segment algorithms and respectively performing 3D modeling of portions contained in the plurality of 3D cube-shaped blocks; and
   merging the 3D first image data, and generating 3D section image data with respect to the entire bodily organ.

2. The method according to claim 1, wherein the setting the region of interest comprises:
   recognizing types of the bodily organ based on a deep learning-based first model, and automatically generating the region of interest corresponding to the recognized types of the bodily organ.

3. The method according to claim 1, wherein the merging comprises:
   merging the 3D first image data through image registration performed through at least one among a feature element registration and a template-based registration.

4. The method according to claim 1, wherein the generating the 3D first image data comprises:
   discriminating a body portion contained in an overlapping region of two or more overlapping blocks among the plurality of 3D cube-shaped blocks based on the segmentation algorithms set to the two or more overlapping blocks.

5. The method according to claim 1, wherein the setting the regions of interest comprises:
- segmenting the region of interest into a first region corresponding to a blood area of the bodily organ and a second region corresponding to a muscle area of the bodily organ;
- setting the first region and the second region as regions of interest, and
- wherein the segmenting includes
- identifying, based on the plurality of pieces of medical image data, the first region when a contrast value of the bodily organ of the first region is a predetermined first value or more, and the second region when a contrast value of the second region is a predetermined second value or less.

6. An apparatus for three-dimensionally modeling an organ through image segmentation comprising:
- a communication unit for acquiring a plurality of pieces of medical image data for a specific bodily organ of a target object; and
- a processor,
- wherein the processor sets a region of interest with respect to the bodily organ based on the plurality of pieces of medical image data, forms a plurality of three-dimensional (3D) cube-shaped blocks corresponding to the region of interest, wherein each of the plurality of 3D cube-shaped blocks includes a portion of the bodily organ corresponding to the regions of interest, sets a respective segment algorithm for a respective 3D cube-shaped block of the plurality of 3D cube-shaped blocks; generates 3D first image data by simultaneously performing a plurality of segmentation works for the plurality of 3D cube-shaped blocks with segment algorithms and respectively performing 3D modeling of portions contained in the plurality of 3D cube-shaped blocks; and merges the 3D first image data, and generates 3D section image data with respect to the entire bodily organ.

7. The apparatus according to claim 6, wherein the processor is further configured to:
- discriminate a body portion contained in an overlapping region of two or more overlapping blocks among the plurality of 3D cube-shaped blocks based on the segmentation algorithms set to the two or more overlapping blocks.

8. The apparatus according to claim 6, wherein the processor is further configured to:
- recognize types of the bodily organ based on a deep learning-based first model, and automatically generate the region of interest corresponding to the recognized types of the bodily organ.

9. The apparatus according to claim 6, wherein the processor is further configured to:
- merge the 3D first image data through image registration performed through at least one among a feature element registration and a template-based registration.

10. A non-transitory computer-readable recording medium in which a program for executing the three-dimensional modeling method of an organ through image segmentation according to claim 1 is stored.

* * * * *